( 12 ) United States Patent
Karstens

(10) Patent No.: US 7,822,918 B2
(45) Date of Patent: Oct. 26, 2010

(54) PREALLOCATED DISK QUEUING

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 11/958,535

(22) Filed: Dec. 18, 2007

(65) Prior Publication Data

US 2009/0157955 A1 Jun. 18, 2009

(51) Int. Cl.
*G06F 12/00* (2006.01)
*G06F 13/00* (2006.01)
*G06F 13/28* (2006.01)
*G06F 9/46* (2006.01)

(52) U.S. Cl. .............. 711/112; 711/158; 711/E12.001; 718/103; 718/104

(58) Field of Classification Search ....................... None
See application file for complete search history.

(56) References Cited

U.S. PATENT DOCUMENTS

| 4,123,795 | A | * | 10/1978 | Dean et al. | 718/103 |
| 5,768,681 | A | * | 6/1998 | Dan et al. | 725/95 |
| 5,835,765 | A | * | 11/1998 | Matsumoto | 718/102 |
| 6,154,769 | A | * | 11/2000 | Cherkasova et al. | 709/207 |
| 7,665,090 | B1 | * | 2/2010 | Tormasov et al. | 718/104 |
| 2002/0087757 | A1 | * | 7/2002 | Wagner | 710/54 |
| 2006/0248533 | A1 | * | 11/2006 | Inari | 718/103 |
| 2007/0016907 | A1 | * | 1/2007 | Benedetti et al. | 718/104 |
| 2007/0022425 | A1 | * | 1/2007 | Jackson | 718/104 |
| 2007/0094665 | A1 | * | 4/2007 | Jackson | 718/104 |
| 2008/0216081 | A1 | * | 9/2008 | Jackson | 718/104 |
| 2009/0119673 | A1 | * | 5/2009 | Bubba | 718/104 |

* cited by examiner

*Primary Examiner*—Matt Kim
*Assistant Examiner*—Ralph A Verderamo, III
(74) *Attorney, Agent, or Firm*—Dillon & Yudell LLP

(57) ABSTRACT

A method, system and computer program product for managing preallocated disk space are presented. The method includes placing a plurality of requests for preallocated disk space on a disk space request queue, wherein each preallocated disk space is preallocated for a fixed amount of disk space and a fixed length of time, and wherein an application using an issued preallocated disk space for more than the fixed length of time results in the application being barred from further current use of the issued preallocated disk space. The requests are sorted in the disk space request queue according to a priority algorithm that establishes a priority level for each of the requests, and preallocated disk space is allocated to requesters according to the priority level established by the priority algorithm.

9 Claims, 4 Drawing Sheets

PREALLOCATED DISK QUEUING

BACKGROUND OF THE INVENTION

The present disclosure relates to the field of computers, and specifically to software that runs on computers. Still more specifically, the present disclosure relates to managing disk space.

BRIEF SUMMARY OF THE INVENTION

A method, system and computer program product for managing preallocated disk space are presented. The method includes placing a plurality of requests for preallocated disk space on a disk space request queue, wherein each preallocated disk space is preallocated for a fixed amount of disk space and a fixed length of time, and wherein an application using an issued preallocated disk space for more than the fixed length of time results in the application being barred from further current use of the issued preallocated disk space. The requests are sorted in the disk space request queue according to a priority algorithm that establishes a priority level for each of the requests, and preallocated disk space is allocated to requesters according to the priority level established by the priority algorithm.

DETAILED DESCRIPTION OF THE INVENTION

Figure 1:
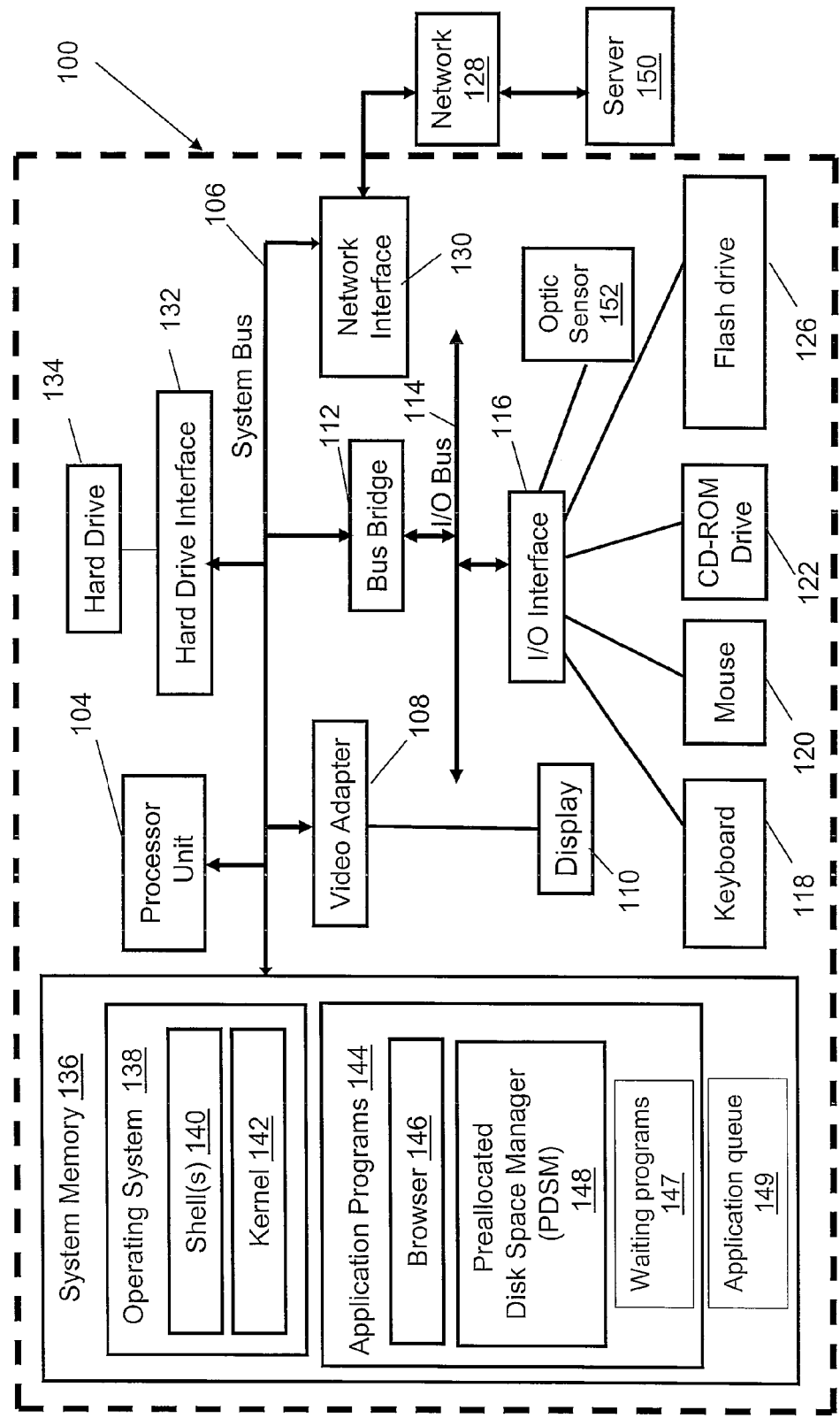
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java® is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash drive 124. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Preallocated Disk Space Manager (PDSM) 148, which includes instructions and data required to execute the processes and steps described below in FIGS. 2-4. Application programs 144 also include waiting programs 147, which are application programs that are waiting to use preallocated disk space, according to their status in an application queue 149, in a manner described below.

In one embodiment, computer 100 is able to download PDSM 148 from a remote service provider server 150, preferably in an "on demand" basis. In another embodiment, server 150 is able to execute PDSM 148, thus reducing demand on hardware and software resources directly attributed to computer 100.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
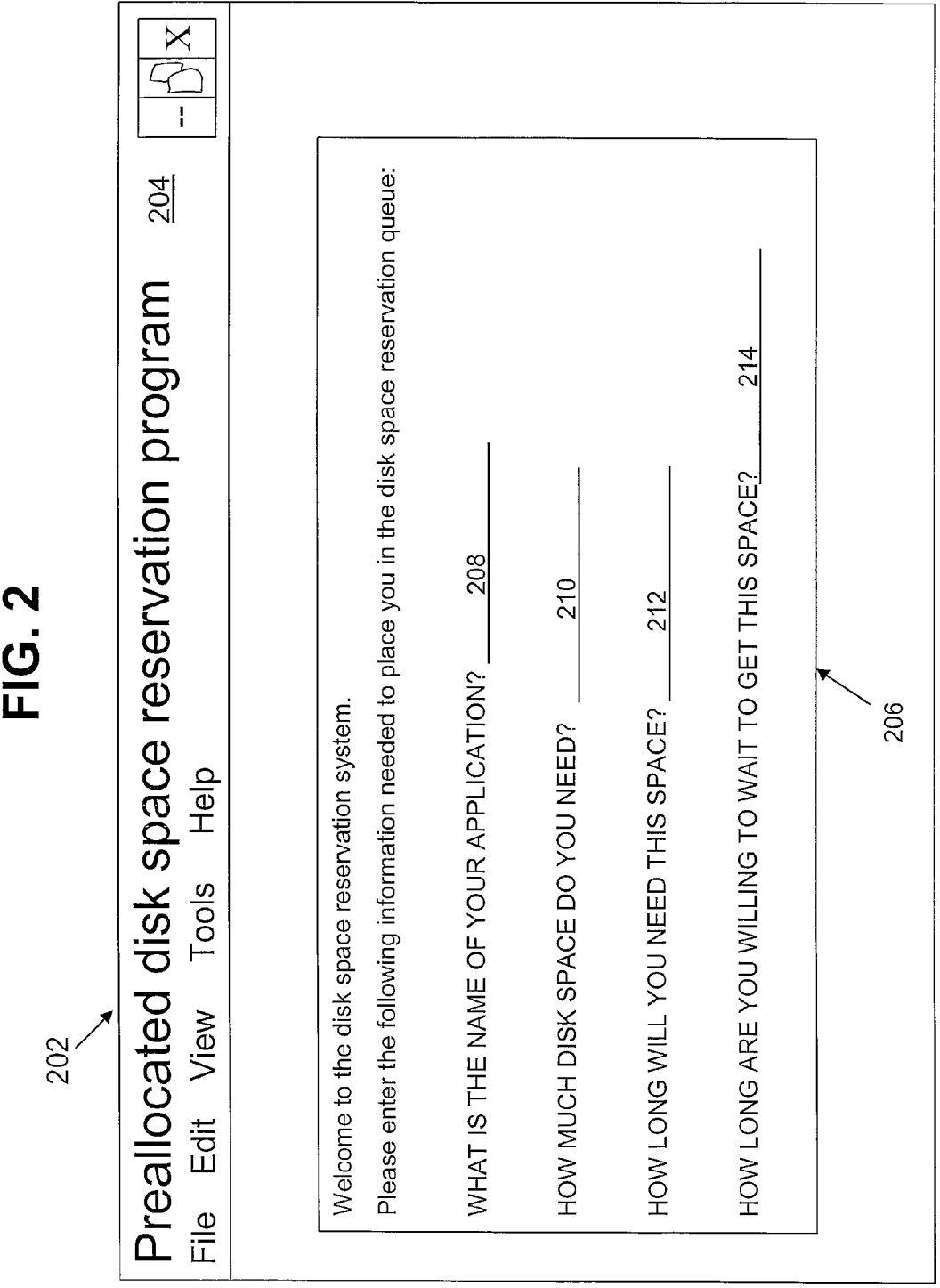
FIG. 2 illustrates an exemplary Graphical User Interface (GUI) that is presented to a user to request preallocated disk space.

Referring now to FIG. 2, an exemplary Graphical User Interface (GUI) 202 for accepting a request for preallocated disk space is presented. GUI 202 is part of a preallocated disk space reservation program 204, which is part of PDSM 148 shown in FIG. 1. GUI 202 allows a user to enter, into a window 206, a request for preallocated disk space. The preallocated disk space is reserved disk space that is preallocated for a fixed amount of disk space and a fixed length of time. These fixed amounts of disk space have been predetermined by a disk manager (either through automatic software or manually), such that the amount of disk space remains static (e.g., 500 MB, 1 GB, 5 GB, 10 GB, etc.). The preallocated disk spaces can only be allocated to/reserved by an application/requester for the fixed amount of time. If an application using an issued preallocated disk space exceeds the fixed length of time, then that application is barred from further current use of the issued preallocated disk space. That is, the application will be "kicked off" the issued preallocated disk space. Note that the fixed amount of time can either be set by the requester (according how long he requested the use of the preallocated disk space), or the fixed amount of time may be a set attribute of a preallocated disk space (i.e., one preallocated disk space can only be made available for five minutes, while another preallocated disk space can only be made available for 30 minutes, etc.). If the fixed amount of time is a set attribute of a preallocated disk space, this fixed amount of time may be set by PDSM 148 by considering the size of the preallocated disk space (i.e., larger disk spaces are preallocated for longer periods of time than smaller disk spaces, or vice versa), how often a particular size preallocated disk space has been requested (e.g., high demand preallocated disk spaces are made available for shorter periods of time), etc.

As suggested by the figure, the user can state the name of the application that will be using the preallocated disk space (field 208); how large the preallocated disk space needs to be (field 210); how long the application will need to have exclusive use of the preallocated disk space (field 212); and how long the requester is willing to wait for the preallocated disk space to be made available to the application (field 214).

Although the GUI 202 shown in FIG. 2 requires the user to manually populate all information related to a particular application that needs preallocated disk space, in one embodiment some of the information can be pre-populated, along with suggestions. For example, assume that a user has just entered "Application A" in field 208. PDSM 148 can then look up "Application A" in a table that shows disk requirements, and auto-populate fields 210 and 212. Furthermore, if the user has entered a shorter time such as "three hours" in field 212, but the lookup table that PDSM 148 accesses suggests four hours, then "four hours" may be suggested in a text message in GUI 202 or another message back to the user, or PDSM 148 may override the "three hours" entry in field 212 and save the preallocated disk space for four hours. Similarly, PDSM 148 may override the size of preallocated space that is called.

Figure 3:
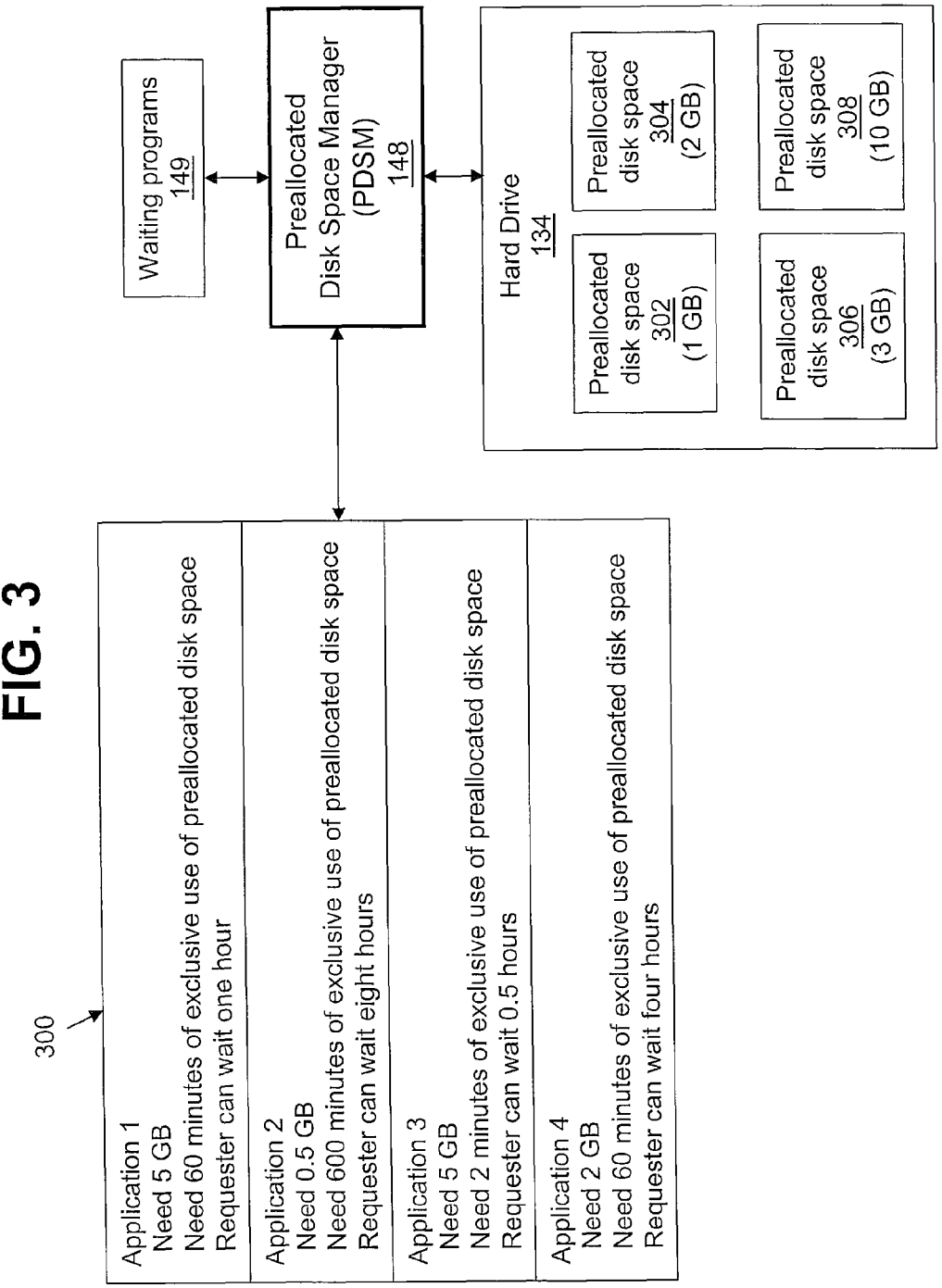
FIG. 3 depicts additional detail of a disk space request queue.

Referring now to FIG. 3, the data for each request is placed into a disk space request queue 300. Each entry in the disk space request queue 300 includes a name of the application that will be using the preallocated disk space, how much disk space is needed, how long the disk space will be needed, and how long the requester is willing to wait. Initially, the requests are placed onto the disk space request queue 300 in a First In First Out (FIFO) manner, such that the oldest requests are handled first. However, PDSM 148 includes an algorithm that is able to weigh the various parameters of the request (i.e., the name of the application, the amount of disk space needed, the length of time the disk space is needed, and how long the requester is willing to wait). For example, assume that Application 1 is first in the queue, but PDSM 148 notices that Application 3 only needs the same amount of preallocated disk space (5 GB) for two minutes, while Application 1 will monopolize this much space for half an hour. Like a maitre d' at a restaurant, the PDSM 148 may let Application 3 have the next available preallocated disk space that can handle 5 GB (e.g., preallocated disk space 308) before Application 1, particularly since the requester is in more of a hurry (can wait only 0.5 hours instead the requester using Application 1 being able to wait only one hour). Note that in the example shown, hard drive 134 does not have a 5 GB preallocated disk space, so PDSM 148 allocates/assigns the 10 GB preallocated disk space 308 to Application 1 and Application 3 (but not both at the same time, since each preallocated disk space is to be used exclusively by a requesting application).

Similarly, PDSM 148 may elect to service requests for smaller amounts of preallocated disk space earlier (e.g., Application 2 needs only 0.5 GB), since the hard drive 134 may have more smaller fixed preallocated disk spaces (e.g., preallocated disk spaces 302, 304 and 306) than the larger preallocated disk space 308. Likewise, if an application name (e.g., "Application 1") is recognized as an application that has a high priority (e.g., a registration or boot application), such applications may be given preferential treatment in the allocation of the preallocated disk spaces.

As the preallocated disk spaces in the hard drive 134 are allocated, the PDSM 148 notifies the appropriate program from the waiting programs 149 (e.g., Applications 1, 2, 3, 4). As soon as a particular program is given the exclusive use of a particular preallocated disk space, that particular program's entry in the disk space request queue 300 is removed. If that particular program needs additional time on the hard drive 134, then another request for the same or another preallocated disk space is submitted to the disk space request queue 300 by the requester.

Figure 4:
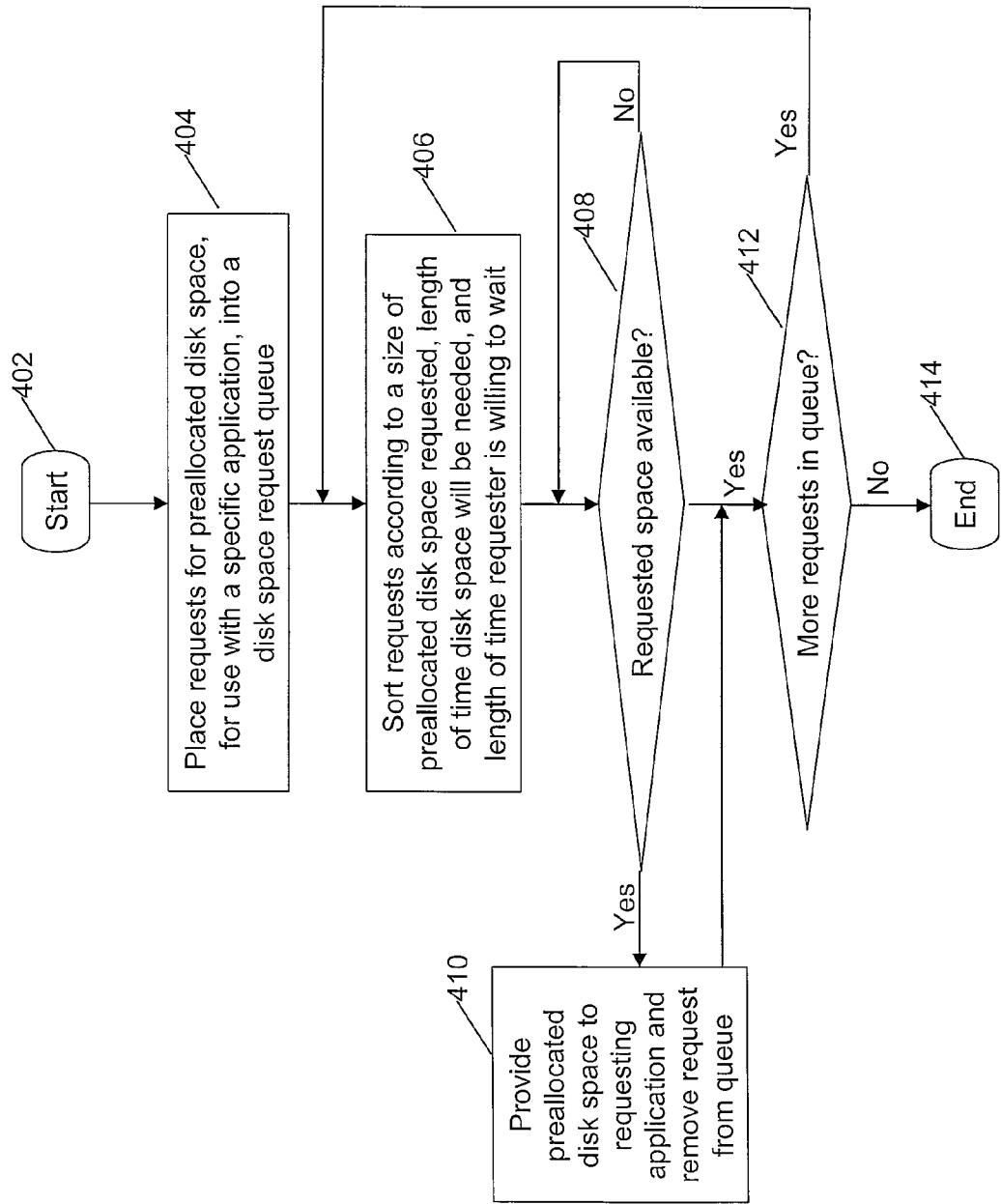
FIG. 4 is a high-level flow-chart of exemplary steps taken by the present invention to manage preallocated disk space.

With reference now to FIG. 4, a high level flow chart of exemplary steps taken to manage preallocated disk space is presented. After initiator block 402, which may be prompted by a user of an application determining that there is a need for a preallocated disk space, a request for preallocated disk space is received by a preallocated disk space manager. This request, which may be for use by a specific application, is placed on a disk space request queue (block 404). In one embodiment, a display of requests on the disk space request queue is presented to the user, showing the user "where in line" his request is at any point of real time. Thus, as new requests come in, and as they are manipulated (as described below at block 406), the user is able to see how much longer he has to wait for his request to be served.

If there are multiple requests on the disk space request queue, then the preallocated disk space manager sorts the requests (block 406) as described above (according to the name of the application that will be using the preallocated disk space, the amount of disk space requested, the length of time that the preallocated disk space will be needed, and the length of time that the requester is willing to wait for the preallocated disk space to become available). As soon as the preallocated disk space manager determines that an appropriate preallocated space is available (query block 408), the requester (and application) are provided/allocated an appropriate preallocated disk space for the fixed amount of time, and the request is removed from the disk space request queue (block 410). Note that a request is also automatically removed from the disk space request queue at any time that the application is cancelled. That is, if an application no longer needs the preallocated disk space, e.g., the application's operations and/or installation is aborted, then that application is removed from the disk space request queue. However, in one embodiment, if the application has completed a certain percentage of an operation that requires the use of the preallocated disk space, then that application request remains on the disk space request queue. For example, assume that the application has completed 95% of the operation that requires the use of the preallocated disk space. If the operation fails, the application request will remain on the queue, and will (preferably) be first in line for the next available preallocated disk space of the requisite size. The process continues as long as more requests are in the disk space request queue (query block 412), after which the process ends (terminator block 414).

As described herein, by evaluating the data entries to determine the data entry classifications for each data entry field, and by counting the occurrences of a particular data entry classification for a particular data entry field, and be determining that the particular data entry classification has occurred more than a predetermined number of times, a presumption can be made that data for that particular data entry field should be of that particular data entry classification. This allows an automatic generation of a prompt that tells the customer what type of data should be entered in a particular data entry field, thus ensuring uniformity in data entries. This also allows the insertion of a reasonable default value that most (future, subsequent) users will be able to use as their own.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method of managing preallocated disk space, the computer-implemented method comprising:
    placing a plurality of requests for preallocated disk space on a disk space request queue, wherein each preallocated disk space is preallocated for a fixed amount of disk space and a fixed length of time, and wherein an application using an issued preallocated disk space for more than the fixed length of time results in the application being barred from further current use of the issued preallocated disk space;
    sorting the requests in the disk space request queue according to a priority algorithm that establishes a priority level for each of the requests, wherein the priority algorithm incorporates a size of disk space requested, a length of time that the requested preallocated disk space will be reserved, and a length of time that a requester of the preallocated disk space is willing to wait for allocation of the requested preallocated disk space; and
    allocating preallocated disk space to requesters according to the priority level established by the priority algorithm.

2. The computer-implemented method of claim 1, wherein each of the requests is for use by a different software application.

3. The computer-implemented method of claim 1, wherein each preallocated disk space is for a different fixed amount of disk space.

4. A system comprising:
    a processor;
    a data bus coupled to the processor;
    a memory coupled to the data bus; and
    a computer-usable medium embodying computer program code, the computer program code comprising instructions executable by the processor and configured for managing preallocated disk space by performing the steps of:
    placing a plurality of requests for preallocated disk space on a disk space request queue, wherein each preallocated disk space is preallocated for a fixed amount of disk space and a fixed length of time, and wherein an application using an issued preallocated disk space for more than the fixed length of time results in the application being barred from further current use of the issued preallocated disk space;
    sorting the requests in the disk space request queue according to a priority algorithm that establishes a priority level for each of the requests, wherein the priority algorithm incorporates a size of disk space requested, a length of time that the requested preallocated disk space will be reserved, and a length of time that a requester of the preallocated disk space is willing to wait for allocation of the requested preallocated disk space; and
    allocating preallocated disk space to requesters according to the priority level established by the priority algorithm.

5. The system of claim 4, wherein each of the requests is for use by a different software application.

6. The system of claim 4, wherein each preallocated disk space is for a different fixed amount of disk space.

7. A non-transitory computer program product for managing preallocated disk space, the computer program product comprising: a computer usable medium having computer usable program code embodied therewith, the computer usable program code comprising: computer usable program code configured to place a plurality of requests for preallocated disk space on a disk space request queue, wherein each preallocated disk space is preallocated for a fixed amount of disk space and a fixed length of time, and wherein an application using an issued preallocated disk space for more than the fixed length of time results in the application being barred from further current use of the issued preallocated disk space; computer usable program code configured to sort the requests in the disk space request queue according to a priority algorithm that establishes a priority level for each of the requests, wherein the priority algorithm incorporates a size of disk space requested, a length of time that the requested preallocated disk space will be reserved, and a length of time that a requester of the preallocated disk space is willing to wait for allocation of the requested preallocated disk space; and computer usable program code configured to allocate preallocated disk space to requesters according to the priority level established by the priority algorithm.

8. The computer program product of claim 7, wherein each of the requests is for use by a different software application.

9. The computer program product of claim 7, wherein each preallocated disk space is for a different fixed amount of disk space.

* * * * *